(12) United States Patent
Blue et al.

(10) Patent No.: US 7,909,139 B2
(45) Date of Patent: Mar. 22, 2011

(54) POWERED LIFT PLATFORM

(76) Inventors: Lewis J. Blue, Wyoming, NY (US);
William E. Meier, Corfu, NY (US)

( * ) Notice: Subject to any disclaimer, the term of this patent is extended or adjusted under 35 U.S.C. 154(b) by 1275 days.

(21) Appl. No.: 11/336,189

(22) Filed: Jan. 20, 2006

(65) Prior Publication Data
US 2007/0169996 A1    Jul. 26, 2007

(51) Int. Cl.
*B66D 1/00* (2006.01)
(52) U.S. Cl. ............ 182/141; 182/36; 182/37; 182/103; 182/148; 182/11
(58) Field of Classification Search ............. 182/36–38, 182/103, 141, 148; 187/11, 14, 240–242, 187/244, 251, 261, 368, 370, 371
See application file for complete search history.

(56) References Cited

U.S. PATENT DOCUMENTS

| | | | |
|---|---|---|---|
| 651,665 A * | 6/1900 | Johns | 182/103 |
| 1,624,945 A * | 4/1927 | Glover | 182/204 |
| 2,943,708 A | 7/1960 | Sasgen | |
| 3,115,211 A * | 12/1963 | Ostrander, Jr. | 182/103 |
| 3,282,375 A | 11/1966 | Ray | |
| 3,336,999 A | 8/1967 | McSwain | |
| 3,428,145 A * | 2/1969 | Lyon | 182/103 |
| 3,681,565 A | 8/1972 | Fisher | |
| 3,908,801 A * | 9/1975 | Pohlman | 187/313 |
| 4,183,423 A | 1/1980 | Lewis | |
| 4,294,332 A * | 10/1981 | Ready | 182/141 |
| 4,512,440 A * | 4/1985 | Bixby | 182/146 |
| 4,593,789 A | 6/1986 | Treants | |
| 4,602,698 A | 7/1986 | Grant | |
| 4,811,803 A | 3/1989 | Green | |
| 4,862,997 A * | 9/1989 | Eberle | 182/148 |
| 5,181,584 A * | 1/1993 | Simard | 182/201 |
| 5,242,030 A * | 9/1993 | Lobozzo | 182/187 |
| 5,282,520 A | 2/1994 | Walker | |
| 5,295,555 A | 3/1994 | Strange | |
| 5,379,861 A | 1/1995 | Amacker | |
| 5,590,738 A | 1/1997 | Hunt et al. | |
| 5,595,265 A | 1/1997 | Lebrocquy | |
| 5,803,694 A | 9/1998 | Steele | |
| 5,862,827 A | 1/1999 | Howze | |
| 6,079,517 A | 6/2000 | Payne | |
| 6,095,284 A * | 8/2000 | Smith | 182/103 |
| 6,244,381 B1 * | 6/2001 | Ruble | 182/103 |
| 6,471,269 B1 | 10/2002 | Payne | |
| 6,533,070 B1 * | 3/2003 | Elrod | 182/103 |
| 6,668,976 B2 | 12/2003 | Graham, Jr. et al. | |
| 6,793,040 B2 | 9/2004 | Ehrenfried, Sr. | |
| 6,811,180 B1 | 11/2004 | Molliere | |

(Continued)

*Primary Examiner* — Katherine Mitchell
*Assistant Examiner* — Colleen M Quinn
(74) *Attorney, Agent, or Firm* — Simpson & Simpson, PLLC

(57) ABSTRACT

The present invention is a powered lift platform including a platform, at least one guide rail section in operative contact with the platform, each of the at least one guide rail sections comprising at least one guide rail and in which a first end of each of the guide rail sections is configured to removably attach to a second end of a second guide rail section. The invention also includes a lift mechanism supported by the platform, a lift guide in operative contact with the lift mechanism and attached to the upper portion of the upper guide rail, a power supply to operate the lift mechanism. In a preferred embodiment, at least one wheel is operatively attached to the powered lift platform. Also presented is a method for securing the powered lift platform to a columnar-like support. Also presented is an extendable standoff.

25 Claims, 17 Drawing Sheets

U.S. PATENT DOCUMENTS

| | | | |
|---|---|---|---|
| 7,004,288 B2 * | 2/2006 | Araki et al. | 182/103 |
| 2002/0139613 A1 | 10/2002 | Hardy et al. | |
| 2003/0000769 A1 | 1/2003 | Pyle | |
| 2003/0051942 A1 | 3/2003 | Atkins | |
| 2003/0089019 A1 | 5/2003 | Napier | |
| 2003/0178251 A1 | 9/2003 | Hewitt | |
| 2004/0083660 A1 | 5/2004 | Atkins | |

* cited by examiner

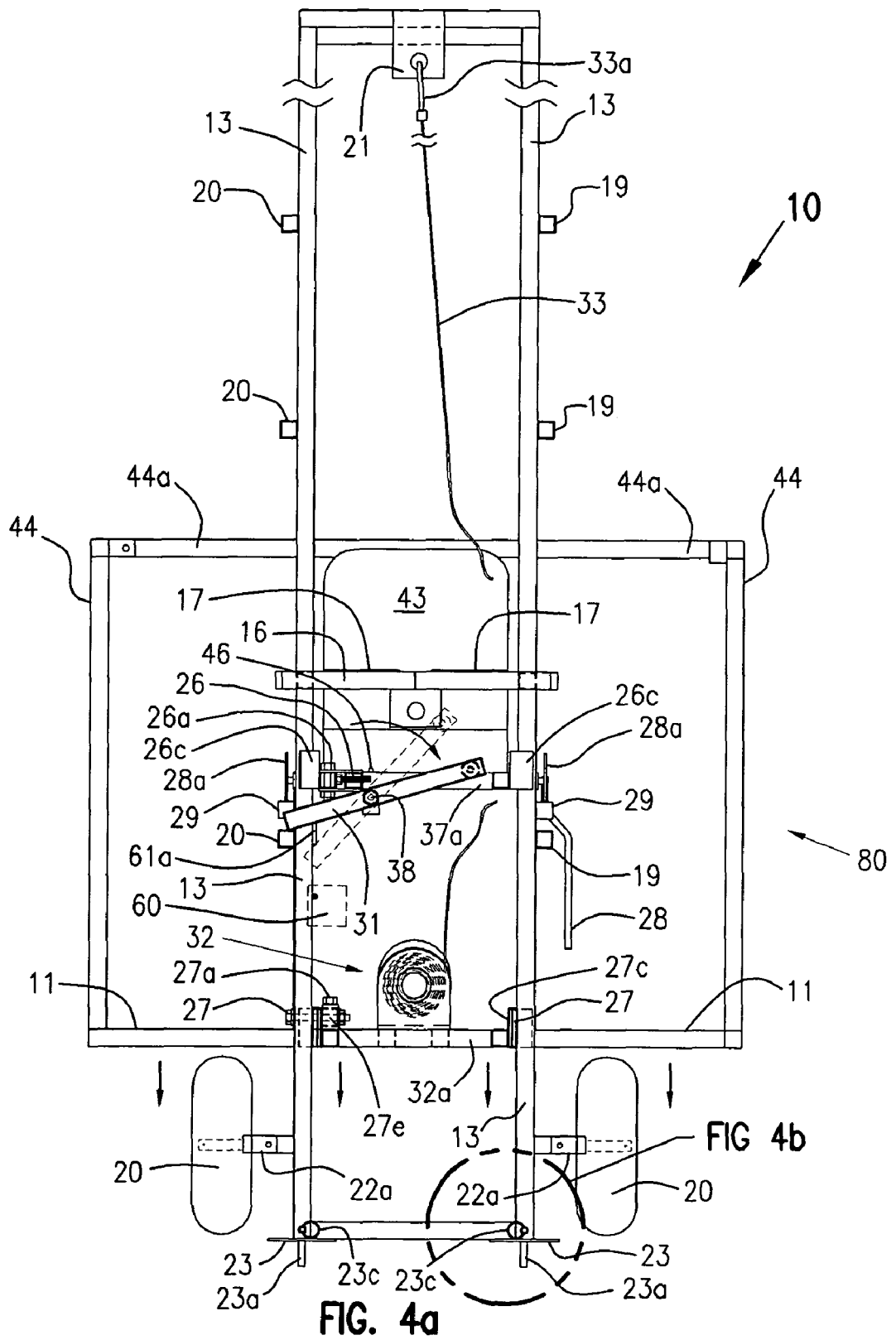

POWERED LIFT PLATFORM

FIELD OF THE INVENTION

The field of the invention relates generally to powered lift devices, particularly to powered hunting tree stands, and more particularly to portable hunting tree stands.

BACKGROUND OF THE INVENTION

Tree stands are well known hunting devices used to elevate one or more hunters to allow them a wider range of vision over the area in which they are hunting. One problem associated with tree stands in general is that they require the user, typically a hunter with a weapon, to physically climb up from the ground onto the tree stand platform. This can be an awkward task as the hunter is most likely carrying a weapon such as a rifle, shotgun, or bow and arrow as well as one or more food and drink containers. More importantly, hunters who are disabled to the point where physically climbing up into or down from a tree stand is either extremely difficult or impossible, are deprived of an important and enjoyable part of the hunting experience.

One other important problem of tree stands in the prior art is that they are often permanent structures. Because elevated tree stands are typically placed in trees or permanent structures, they are difficult to easily move from one location to another. Consequently, they are often left in place and exposed to weathering and other destructive effects that eventually lead to the deterioration of the tree stand.

The prior art contains examples of mechanized tree stands and powered lifts. U.S. patent application Nos. 2004/0083660 to Atkins, 2003/0000769 to Pyle, 2002/0139613 to Hardy are examples of recent publications disclosing portable and elevating hunting stands. Also included in this group is U.S. Pat. No. 5,862,827 to Howze. While the devices disclosed in these publications are all portable and capable of mechanized elevation, in each case the user must climb a ladder to reach the elevated platform. Thus, even though the platforms disclosed can be elevated, they provide no benefit to either a disabled hunter or one overly burdened with equipment who is attempting to climb into the platform.

U.S. patent application No. 2003/0178251 to Hewitt and U.S. Pat. No. 6,471,269 to Payne, U.S. Pat. No. 5,803,694 to Steele, U.S. Pat. No. 4,602,698 to Grant disclose tree stands which provide mechanized elevation for the user. In addition, U.S. Pat. No. 3,681,565 to Fisher discloses a suspended welding booth which mechanically raises the welder to a suspended position against a wall or other vertical structure. However, a review of these publications reveals an additional problem, namely the stability of the suspended platform. In each publication, the suspended platform, chair or booth is lifted off the ground and depends solely on the structural stability of a suspension system for safe support rather than using the actual ground as a foundation to support the elevated user.

U.S. Pat. Nos. 2,943,708 to Sasgen and U.S. Pat. No. 4,183,423 to Lewis both disclose mechanized hoists that remain placed on the ground or floor. However, both have the lift mechanism positioned off the elevating platform requiring someone other than the rider to raise and lower the platform. U.S. Pat. No. 5,595,265 to Lebroquy discloses a powered vertical lift but its configuration severely limits the height to which the lift may ascend. In addition, it fails to provide lateral stability to the suspended lift.

Therefore, there is a need in the field for a portable powered tree stand that is easily maneuverable, provides mechanized elevation to the user, and provides stability to a platform when it is the raised position.

SUMMARY OF THE INVENTION

The present invention comprises a powered lift platform that includes a platform, at least one guide rail section in operative contact with the platform, each of the at least one guide rail sections comprising at least one guide rail and in which a first end of each of the guide rail sections is configured to removably attach to a second end of a second guide rail section, a lift mechanism supported by the platform, a lift guide in operative contact with the lift mechanism and attached to the upper portion of the upper guide rail, a power supply to operate the lift mechanism. In a preferred embodiment, at least one wheel is operatively attached to the powered lift platform. The present invention further comprises a method of securing the powered lift platform to a vertical or sloping support. The present invention also includes an extendable standoff to adjustably support a device against a vertical or sloping support.

An object of the invention is to provide a powered or mechanized lift operated by a user positioned on the platform.

A second object of the invention is to provide a powered lift platform that is positioned on the ground or floor.

A third object of the invention is to provide a powered lift platform with lateral stability when elevated off the ground.

An additional object of the invention is to provide a powered lift platform in which the user may remain on the platform to secure the device to a vertical structure such as a tree or column.

BRIEF DESCRIPTION OF THE SEVERAL VIEWS OF THE DRAWINGS

The nature and mode of the operation of the present invention will now be more fully described in the following detailed description of the invention taken with the accompanying drawing Figures, in which:

FIG. 4a is a rear view of the powered lift platform depicting the activation of the cable break stop by the broken cable;

DETAILED DESCRIPTION OF THE INVENTION

At the outset, it should be appreciated that like drawing numbers on different drawing views identify identical structural elements of the invention. While the present invention is described with respect to what is presently considered to be the preferred embodiments, it is understood that the invention is not limited to the disclosed embodiments. The present invention is intended to cover various modifications and equivalent arrangements included within the spirit and scope of the appended claims.

Figure 1:
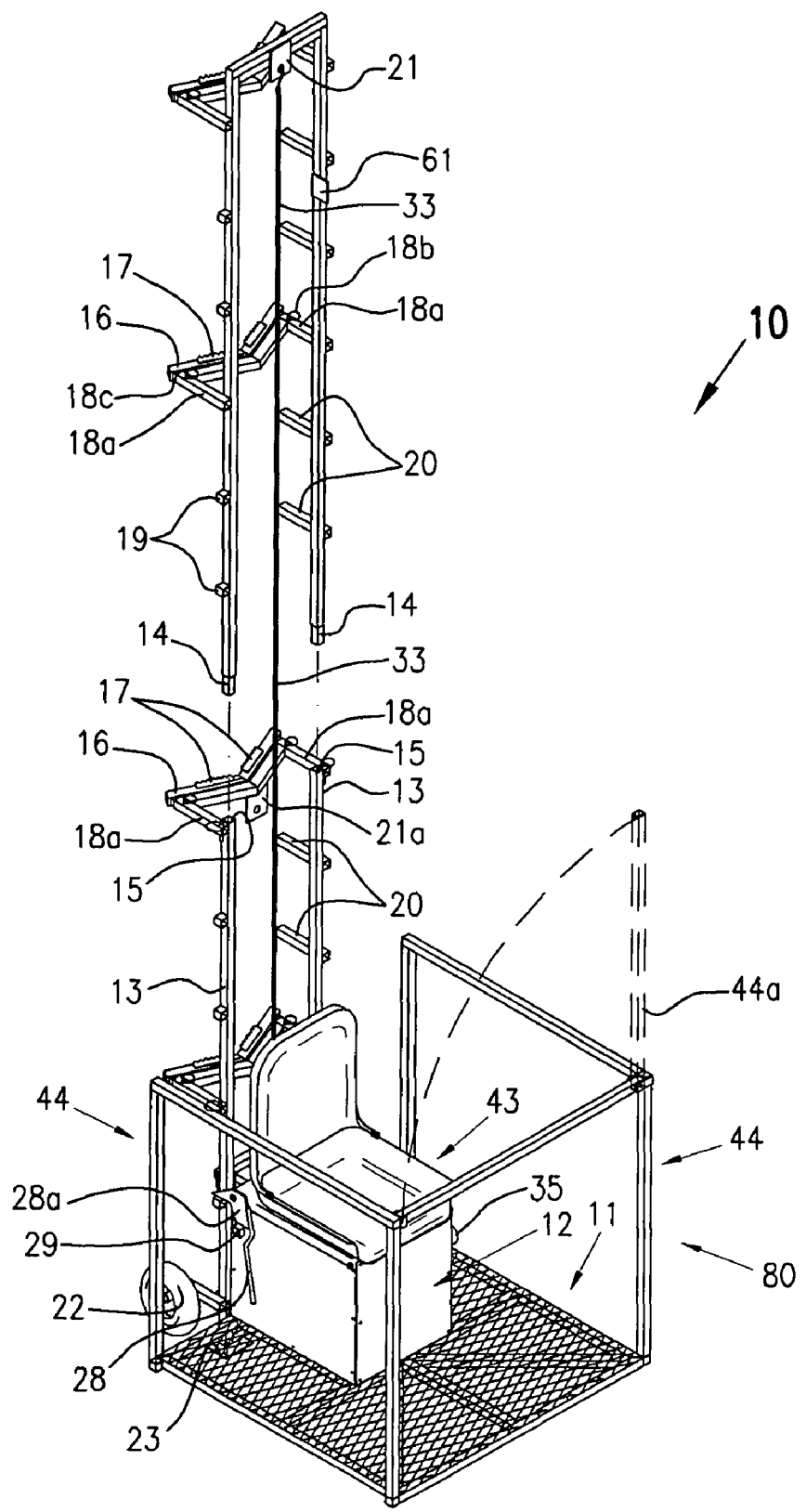
FIG. 1 depicts a perspective view of the powered lift platform of the present invention.

Adverting to the drawings, FIG. 1 depicts a perspective view of powered lift platform 10. Carriage 80 comprises the movable component of powered lift platform 10 and includes at a minimum platform 11. Carriage 80 also includes other components found in various embodiments described and shown as attached directly or indirectly to platform 11. Platform 11 is shown supporting power box 12 which houses a battery (not shown) and holds a battery switch 35 that is used as a power control. In a preferred embodiment, switch 35 is rotated in one direction to power platform 11 upward and rotated in the opposite direction to move platform 11 down. A suitable battery is a 12 volt all glass mat battery made by Universal Power Group. In addition, an AC inverter may be used. Preferably, a solar trickle charge device may be attached to the battery to constantly maintain battery charge when power lift platform 10 remains outdoors. In the preferred embodiment shown, seat 43 is supported by power box 12. Also not shown in FIG. 1 is the housing for winch 32 which is secured to platform 11 and used to raise and lower platform 11. Stop lever 28 includes safety stop blade 28a and is also attached to a second safety stop blade 28a (not shown in FIG. 1) by means of safety axle 30. Stop lever 28 and safety stop blades 28a are welded or otherwise securely attached to axle 30 as shown in FIGS. 3 and 3a. Guide rails 13 are shown in operative attachment with platform 11 which is described in detail below and seen in FIGS. 2-3c. By operative attachment or operative contact is meant the contacting of carriage 80, platform 11 or a part of or a component of power lift platform 10 with guide rails 13 during at least a portion of the movement of platform 11 along guide rails 13. Although a guide rail section having one guide rail 13 may be used to raise and lower platform 11 or carriage 80, in the preferred mode shown in FIG. 1, pairs of guide rails 13 comprise a guide rail section.

In a preferred embodiment, guide rails 13 are approximately 6 feet in length. In a more preferred embodiment, more than one set of guide rails is used to allow platform 11 to be pulled to a greater heights if desired. In the more preferred embodiment shown in FIG. 1, guide rail inserts 14 can be inserted into guide rail sockets 15 to enable platform 11 to be moved efficiently up and down more than one section or set of attached guide rails 13. Alternatively, sets of guide rails 13 can be bolted together or attached by alternate means well known in the art to enable them to be placed into an upright position.

In a preferred embodiment, guide rails 13 include attached standoffs or grippers 16 that rest against a vertical support such as a tree, lamp post, pole or other vertical support (not shown in FIG. 1). In a preferred embodiment, grippers 16 include teeth 17 to allow a more secure hold against vertical supports such as tree trunks. In a more preferred embodiment, gripper adjustments 18 are provided to extend or retract grippers 16 from or toward guide rails 13. Use of gripper adjustment 18 allows guide rails 13 to be positioned in a more upright (nearly vertical) orientation even if the vertical support is itself in a comparatively more sloping (non-vertical) position.

Powered lift platform 10 is operated by a lift mechanism attached to platform 11 and placed in operative contact with a lift guide that provides lift support for the lift mechanism and/or lift guide for the lift mechanism. FIGS. 1, 2, 2a, 4, 4a, 5, and 5a show one type of lift mechanism, namely winch 32 attached to platform 11 through winch frame 32a. Cable 33 is attached to winch 32 and to cable anchor 21 at an anchor point preferably located at the top of the highest guide rail 13 and acts as the lift guide for winch 32. The anchor point is defined as the location where the lift guide (cable 33 in the embodiment shown in FIG. 1) is secured to guide rail section 13. In a preferred embodiment, a second cable anchor 21a is placed on a lower guide rail 13 section to enable platform 11 to be raised sufficiently on lower guide rails 13 to allow the operator to more easily attach an additional guide rail section 13 to the lower guide rail 13 section. Platform 11 is transported along guide rails 13 as winch 32 winds or unwinds cable 33. Preferably, winch 32 is operated from platform 11 using switch 35 as it is raises or lowers platform 11 along guide rails 13. Switch 35 may be located on power box 12 and is connected to the battery and winch 32. In an alternate embodiment, switch 35 and power cord 34 may be located proximate to the ground to allow the operator to remain on the ground while operating powered lift platform 10. It will be recognized that in this alternate embodiment, switch 35 and power cord 34 may be a hand-held control used by the operator positioned on platform 11.

Also shown in FIG. 1 are safety rails 44 which extend along the sides and front of platform 11. In one embodiment, rails 44 comprise two sets of rails each possessing two risers supporting a crosspiece. Detachable front rail 44a links the two sets of side rails. Base plates 23 are attached to the bottom of each of guide rail sections 13 and provide support for guide rail sections 13 against the ground.

Figure 2:
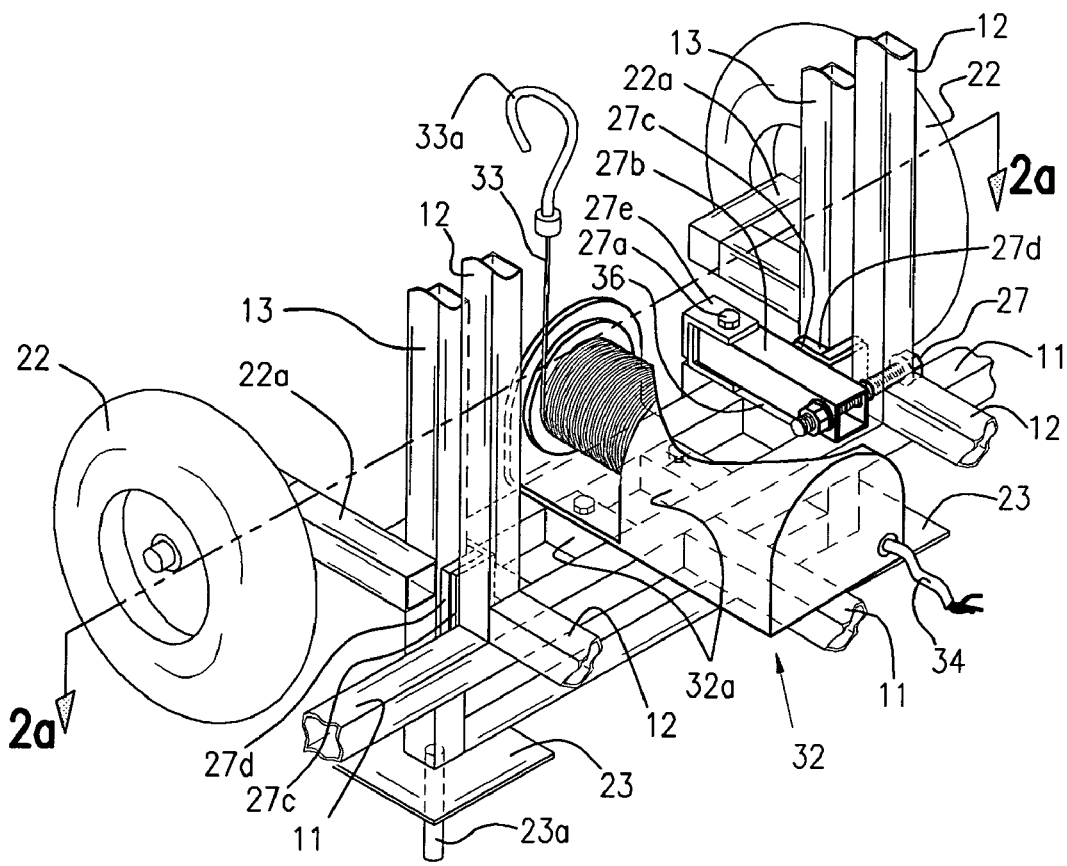
FIG. 2 is a magnified perspective view of the lower slider adjustment of the present invention.
Figure 2A:
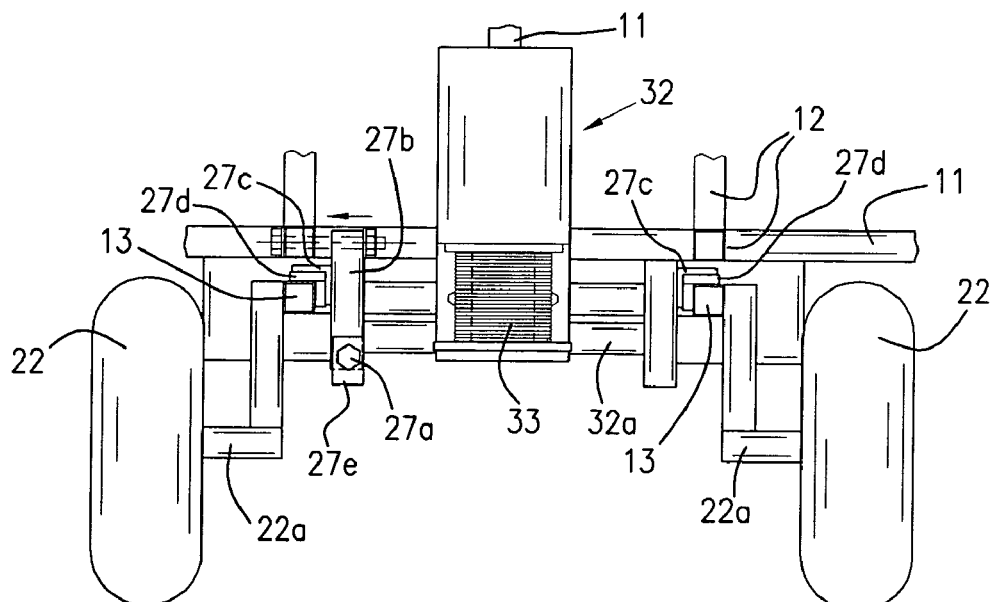
FIG. 2a is a top view taken along line 2A-2A of FIG. 2 showing the lower slider adjustment.
Figure 3:
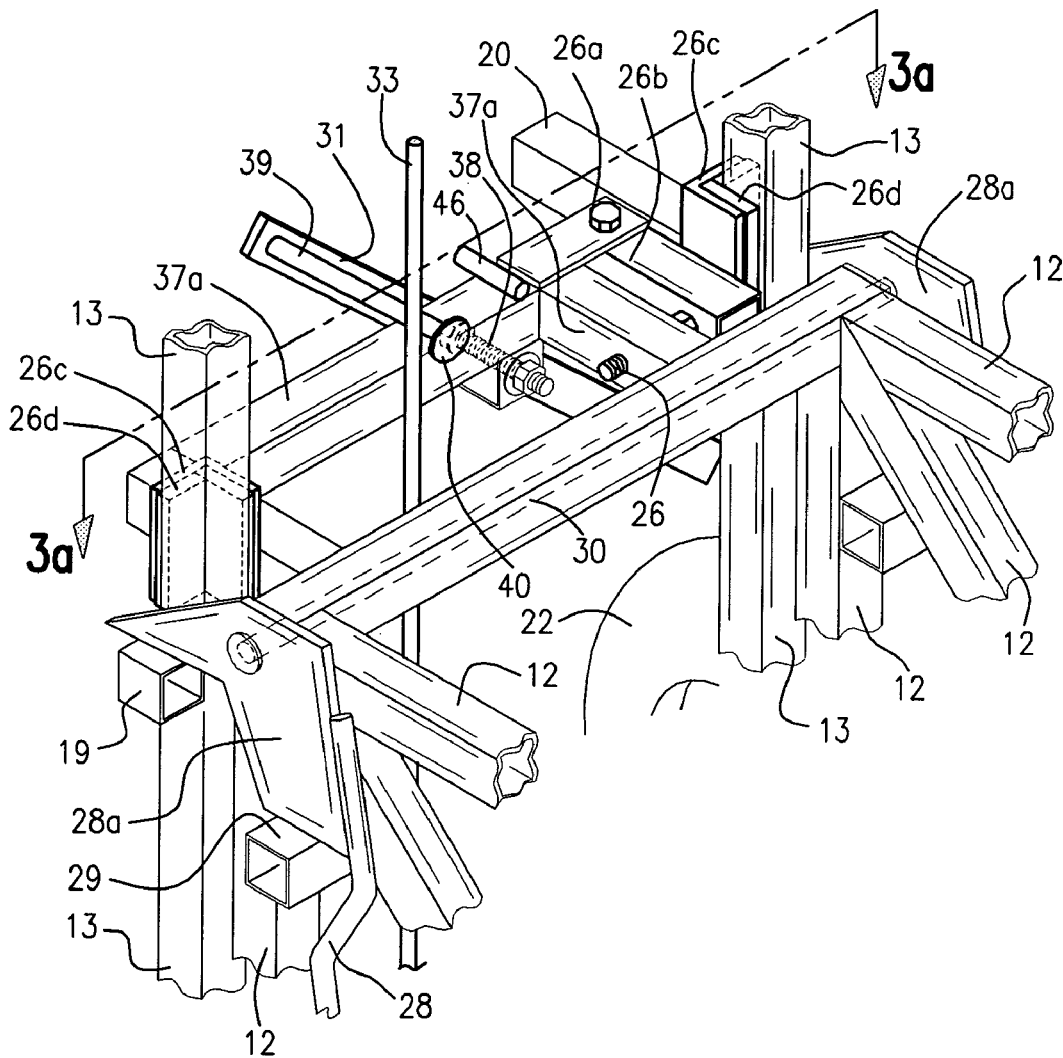
FIG. 3 is a magnified perspective view of the upper slider adjustment and cable break stop of the present invention.
Figure 3A:
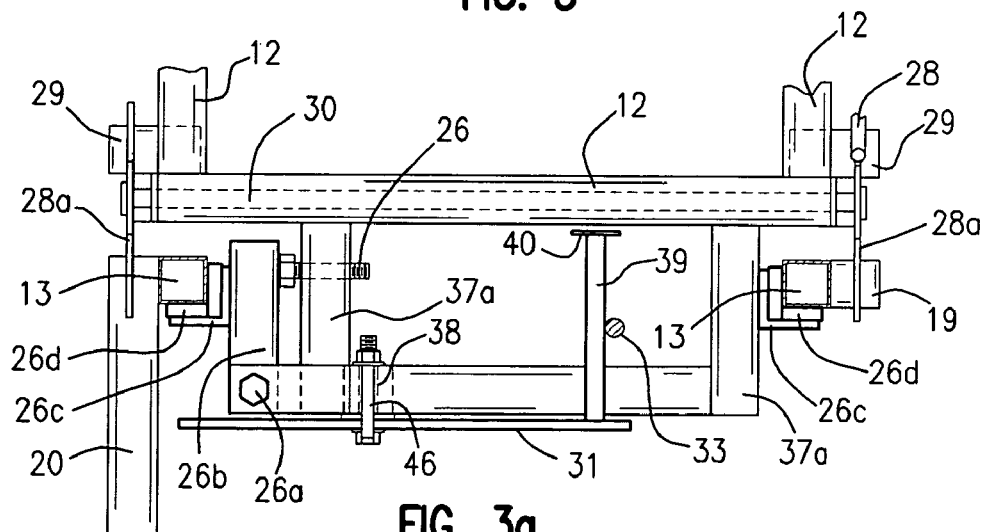
FIG. 3a is a top view of the upper slider adjustment and cable break stop of the present invention.

FIG. 2 is a magnified perspective view of lower slide adjustment 27. Bolt 27 is shown extending through lower lever arm 27b. Lower press pad 27c is attached to lower lever arm 27b. Lower guide pad 27d is attached to lower press pad 27c. As bolt 27 is tightened, it draws lower guide pad 27d (attached to lower press pad 27c) against the internal side of guide rail section 13 by pivoting lever arm 27b around pivot point 27a. Preferably, lower press pad 27c is made from a metal such as is used in typical angle iron and lower guide pad 27d is made from a plastic with some resilience such as Teflon to reduce the friction between lower guide pad 27d and the internal side of guide rail 13. Pivot point 27a can be a bolt rod or similar device that is placed through lever arm 27b as shown to allow it to pivot or rotate. Gap 36 is established between lower lever arm 27b and winch frame 32a using lower adjustment spacer 27e to allow lower lever arm 27b to rotate freely. Gap 36 is exaggerated in FIG. 2 for clarity. FIG. 2a is a top view of lower slide adjustment 27. Ultimately, this lower adjustment mechanism presses lower guide pad 27d against guide rail 13 to help stabilize platform 11 against guide rails 13 as it is raised and lowered. Also seen in FIG. 2 are wheels 22 operatively attached to powered lift platform 10. By operative attachment is meant that at least one wheel 22 is attached to powered lift platform 10 to allow it to be towed or otherwise moved using a wheel, tire or equivalent device. In the embodiment shown, two wheels 22 are attached to guide rails 13 by means of wheel attachments 22a. In an alternate embodiment, wheels 22 may be attached to platform 11. FIG. 2 also shows base plate prong 23a which is positioned into the ground to further support power lift platform 10.

FIG. 3 is a magnified perspective view of upper slide adjustment 26. In this preferred embodiment, the head of bolt 26 is placed between upper lever arm 26b and cable stop frame 37a and extends through cable stop frame 37a. In the embodiment shown, cable stop frame 37a is threaded. In an alternate embodiment, a nut is secured to cable stop frame 37a to secure bolt 26. As bolt 26 is tightened or loosened, it decreases or increases pressure onto upper press pad 26c, attached to upper lever arm 26b and upper guide pad 26d, attached to upper press pad 26c. Ultimately, this enables pressure to be applied through upper guide pad 26d against the internal surface of guide rail 13. In this preferred embodiment, the end opposite the head of bolt 26 extends through cable stop frame 37a and is not "mushroomed" by pressing against upper press pad 26c. It should be recognized that this preferred embodiment can be used for the lower slide adjustment 27 and that the arrangement described above for lower slide adjustment 27 can be used for upper slide adjustment 26.

FIG. 3a, taken along line 3a-3a in FIG. 3, is a top view of upper slider adjustment 26. Similar to lower slide adjustment 27 described above, upper press pad 26c may be made from angle iron while upper guide pad 26d is made from a plastic such as Teflon to reduce friction with the internal surface of guide rail 13.

Figure 3B:
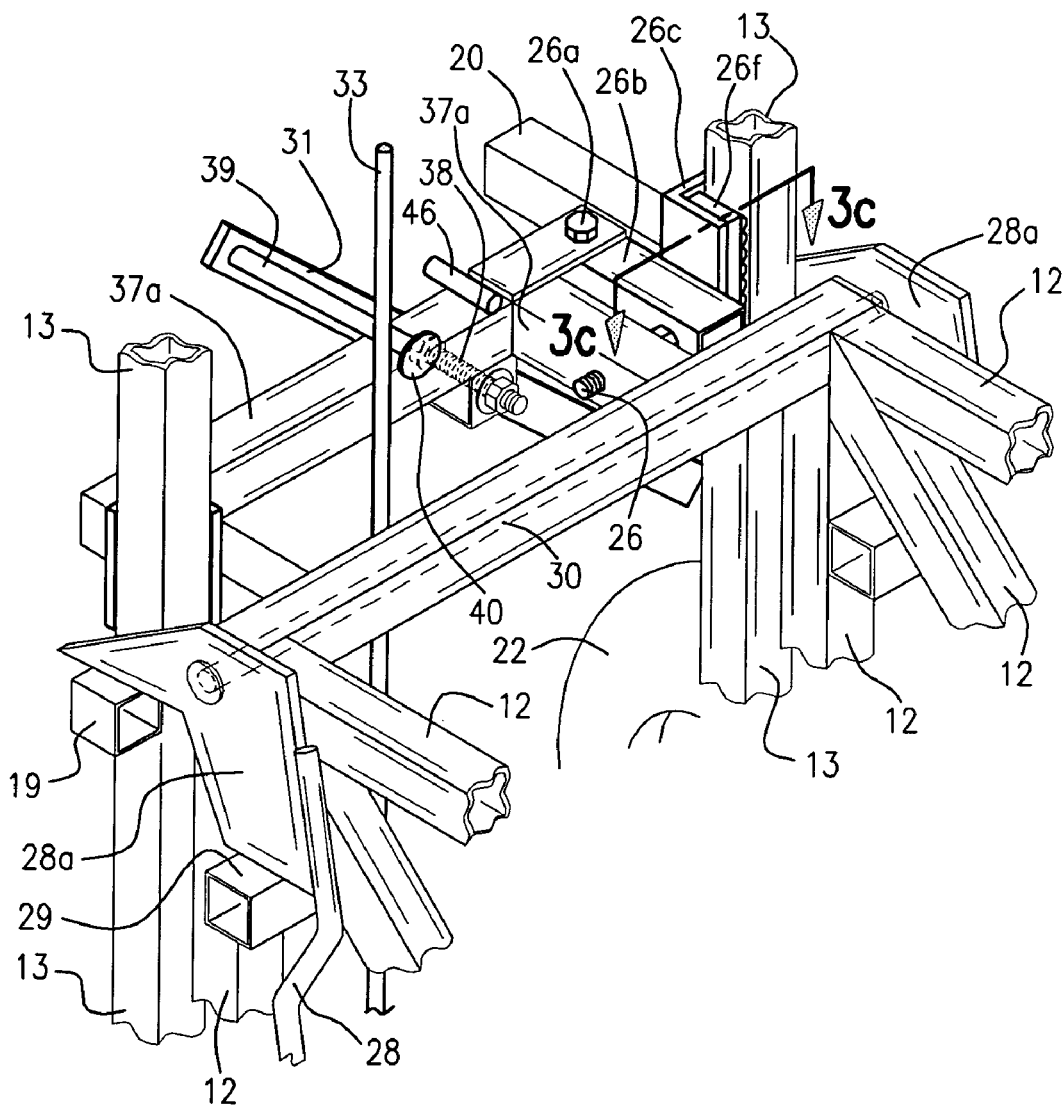
FIG. 3b is a magnified perspective view of an alternate embodiment of the upper slide adjustment.
Figure 3C:
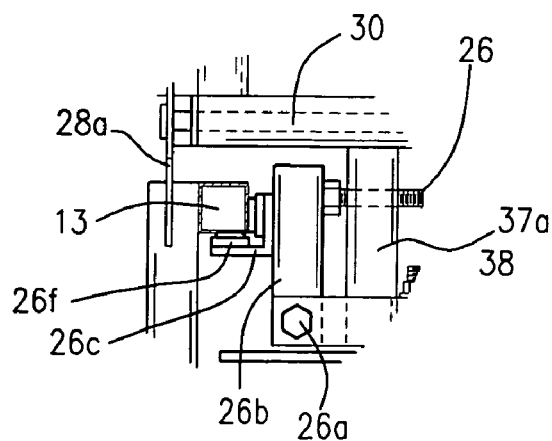
FIG. 3c is a top view of the alternate embodiment of the upper slide adjustment.

FIG. 3b shows depicts an alternate embodiment in which upper guide pad 26d is replaced by bearings 26f. Bearings 26f are biased against the internal surface of guide rail section 13 to reduce friction between platform 11 and guide rail section 13 as platform 11 moves along the guide rail section 13. Bearings 26f may also be used in lower slide adjustment 27. FIG. 3c is a top view of the embodiment seen in FIG. 3b.

Also shown in FIGS. 3 and 3a is cable break stop 31. Cable break stop 31 is attached to cable stop frame 37a at pivot 38 and is functionally associated with cable 33. By functional association is meant that the position of cable break stop 31 in relation to platform 11 and lock stop 19 or ladder step 20 is dependent on whether cable 33 is intact (or taut) or broken (or slack) as described below. When cable rest 39 of cable break stop 31 contacts cable 33 above pivot 38, cable break stop 31 has insufficient length to reach to ladder step 20, but can extend to ladder step 20 when it rotates to a more horizontal orientation. During operation, cable 33 is arranged to contact cable rest 39 on the opposite side from pivot 38 and cable break stop 31 is orientated so cable rest 39 is rotated away from ladder step 20. As winch 32 winds cable 33, cable stop 40 prevents cable 33 from losing contact with cable rest 39 as winding cable 33 travels back and forth along the spool of winch 33. Cable break stop 31 functions to stop platform 11 from falling should cable 33 break or become slack. In the situation when platform 11 is stopped and cable 33 becomes slack, cable break stop 31 continues to rest against cable 33. As cable 33 becomes taut when platform 11 starts to move, the snapping action will tend to push cable break stop 31 away from cable 33. Cable pivot stop 46, preferably located over pivot 38 prevents cable break stop 31 from rotating too far and ensures the cable rest 39 contacts cable 33.

Figure 4:
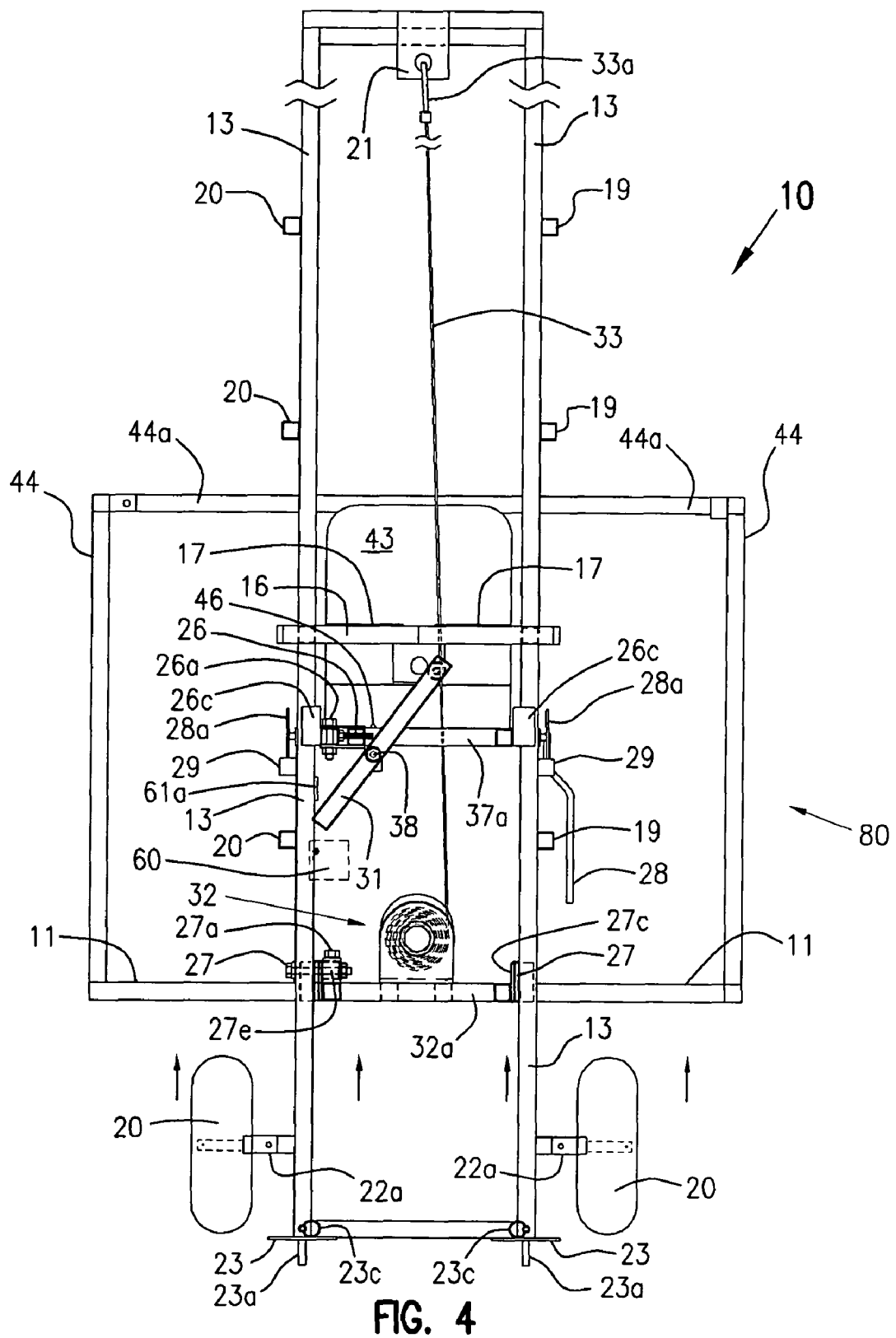
FIG. 4 is a rear view of the powered lift platform of the present invention.

FIG. 4 is a rear view of powered lift platform 10 depicting cable rest 39 (not shown in FIG. 4) of cable break stop 31 contacting cable 33 as platform 11 is being raised. FIG. 4a demonstrates the action of cable break stop 31 after cable 33 breaks causing platform 11 to fall. In the event of such a break, while platform 11 falls, cable rest 39 will rotate until it contacts and rests against cable break frame 37a thus preventing further rotation in that direction. Simultaneously, during the fall of platform 11, the opposite end of cable break stop 31 rotates until it contact ladder step 20 (or lock stop 19 if cable break stop 31 is oriented toward the opposite side). Because cable break frame 37a prevents rotation of the cable rest 39 end of cable break stop 31 and ladder step 20 prevents rotation of the opposite end of cable break stop 31, platform 11 is prevented from falling by the wedged position of cable break stop 31 created during the fall. FIGS. 4 and 4a also show paired lower slide adjustment 27 and paired upper slide adjustment 26b each attached to opposite sides of platform 11.

Figure 4B:
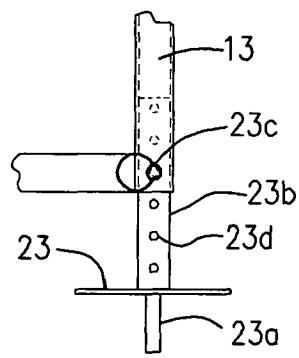
FIG. 4b is a magnified side view of the adjustment assembly for the base plate of the present invention.

FIG. 4b depicts an adjustment assembly for base plate 23. Telescoping slide 23b includes adjustment holes 23d and moves within guide rail section 13. To provide more level support for power lift platform 10 on uneven ground, telescoping slide 23b of each guide rail section 13 can be separately adjusted by moving adjustment holes 23d to a desired level and then securing them in place by pin 23c which is inserted through a hole in guide rail section 13 and through an appropriate adjustment hole 23d to provide a firm support for each base plate 23 whether on even or uneven ground. In one embodiment, adjustment holes 23d are placed approximately one inch apart, but different distances may be used if desired.

Figure 5:
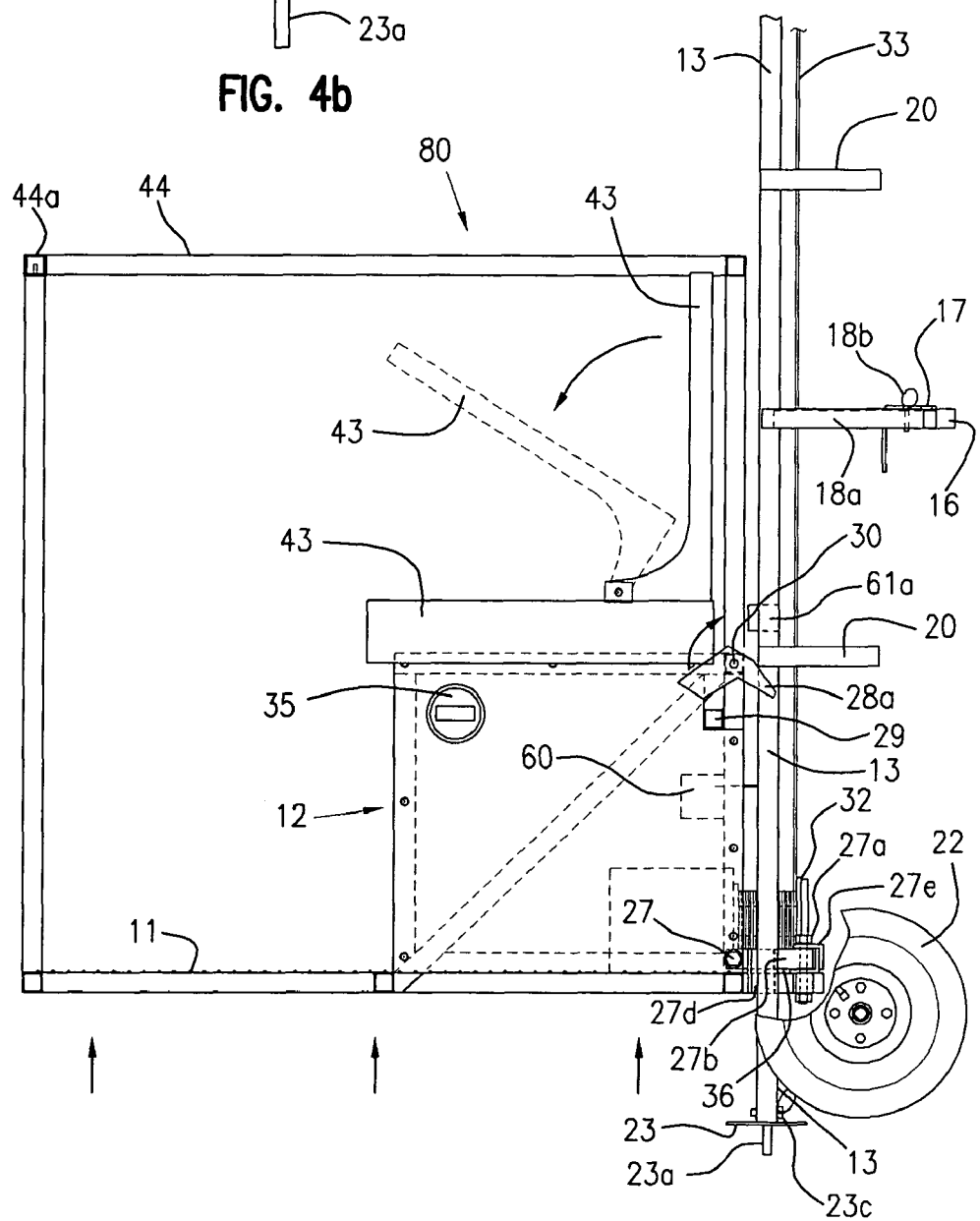
FIG. 5 is a side view of the powered lift platform of the present invention.
Figure 5A:
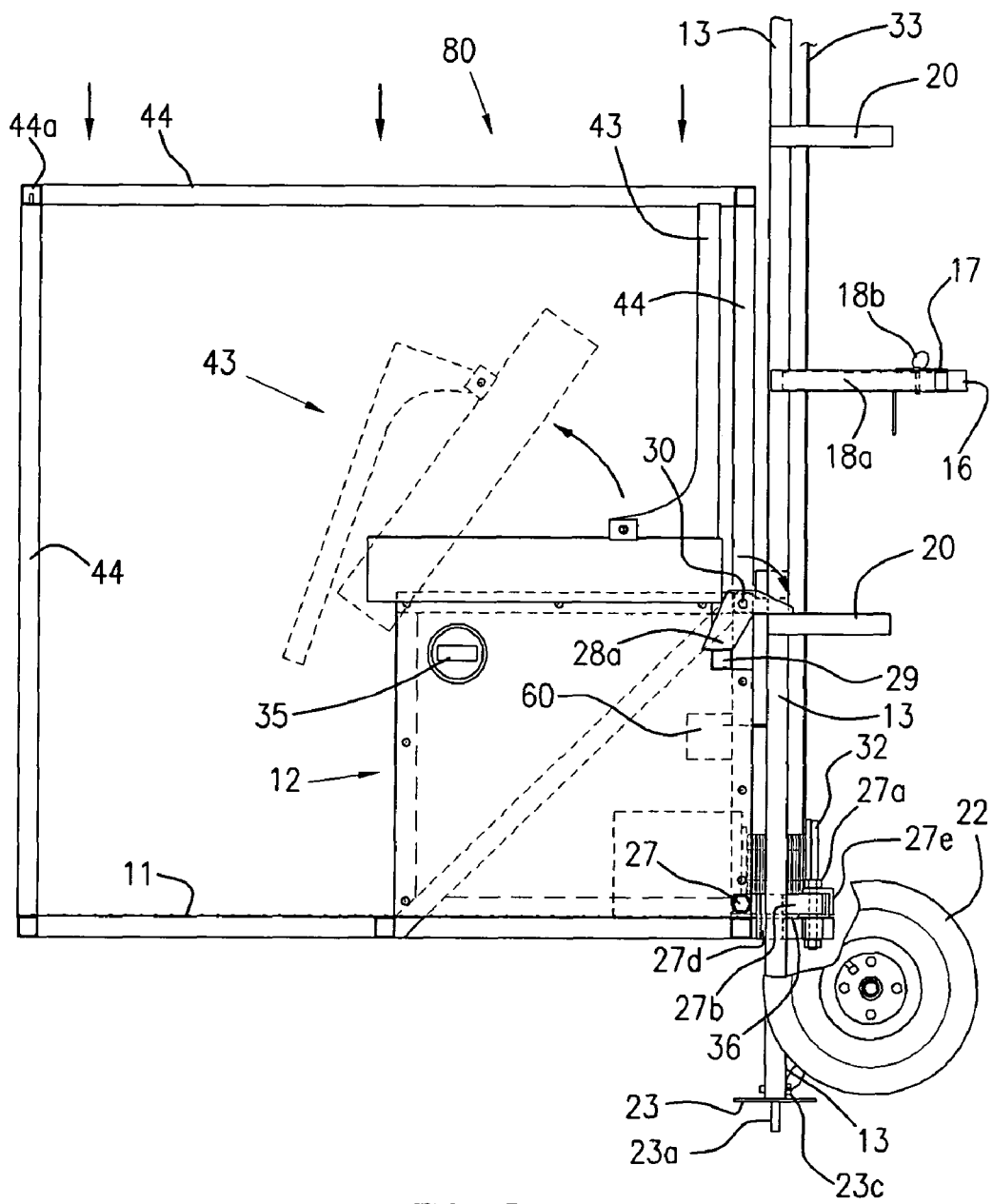
FIG. 5a is a side view of the present invention in which the safety lock is activated.

FIG. 5 is a side view demonstrating the structure of safety stop lever 28. Safety stop lever 28 and stop axle 30 pivot is seen in FIG. 3 to turn paired stop blades 28a. Stop blocks 29 are positioned on each side of power box 12 to prevent complete rotation of stop lever 28. Stop lever 28 functions as an emergency brake if platform 11 should unexpectedly fall. As platform 11 is raised up along guide rails 13, stop blades 28a contact the bottoms of safety stop 19 and ladder steps 20 located on opposite sides of guide rails 13. The continued upward movement of platform 11 forces safety lever 28, safety blades 28a and axle 30 to rotate. After clearing safety block 19 and ladder step 20, safety lever 28 rotates back to contact safety stop blocks 29. It will be easily recognized that if the operator holds safety lever 28 up, safety blades 28a rotate out of the contact path to prevent the intermittent contact with successive safety stops 19 and ladder steps 20 as platform 11 is raised or lowered. It will also be recognized that if platform 11 should fall, safety blades 28a will contact the upper surface of either or both of safety stop 19 or ladder step 20. Because safety block 29 is positioned in the rotational path of safety lever 28, its presence prevents further rotation of safety blades 28a off both safety stop 19 and ladder step 20 thus holding platform 11 and preventing the fall from continuing as seen in FIG. 5a. Ladder steps 20 can also be used to climb down from platform 11 when it is stopped in a raised position off the ground.

FIGS. 5 and 5a also show a preferred embodiment in which switch 60 is positioned preferably on carriage 80. Carriage 80 is defined as the entire movable component of powered lift platform 10 that moves up and down guide rail section(s) 13. Switch 60 is a type of normally open, normally closed switch such that when activated, it shuts off power to the up drive of winch 32 or other powered lift mechanism and maintains power to the down drive. Switch 60 is activated by actuator 61 (see FIG. 9) placed toward the top of upper guide rail section 13 so that as platform 11 reaches an upper limit (such as when cable 33 is wound almost completely onto winch 32, switch 60 is activated by actuator 61 to prevent platform 11 from moving further up guide rail sections 13 and allows platform 11 to move only down guide rail sections 13. In a more preferred embodiment, lower actuator 61a is movably attached to the lowest guide rail section 13 to prevent platform 11 from being lifted too high before upper guide rail section 13 is attached. After attachment, lower actuator 61a is moved away from the lift path by hinges or other means known in the art.

Figure 6:
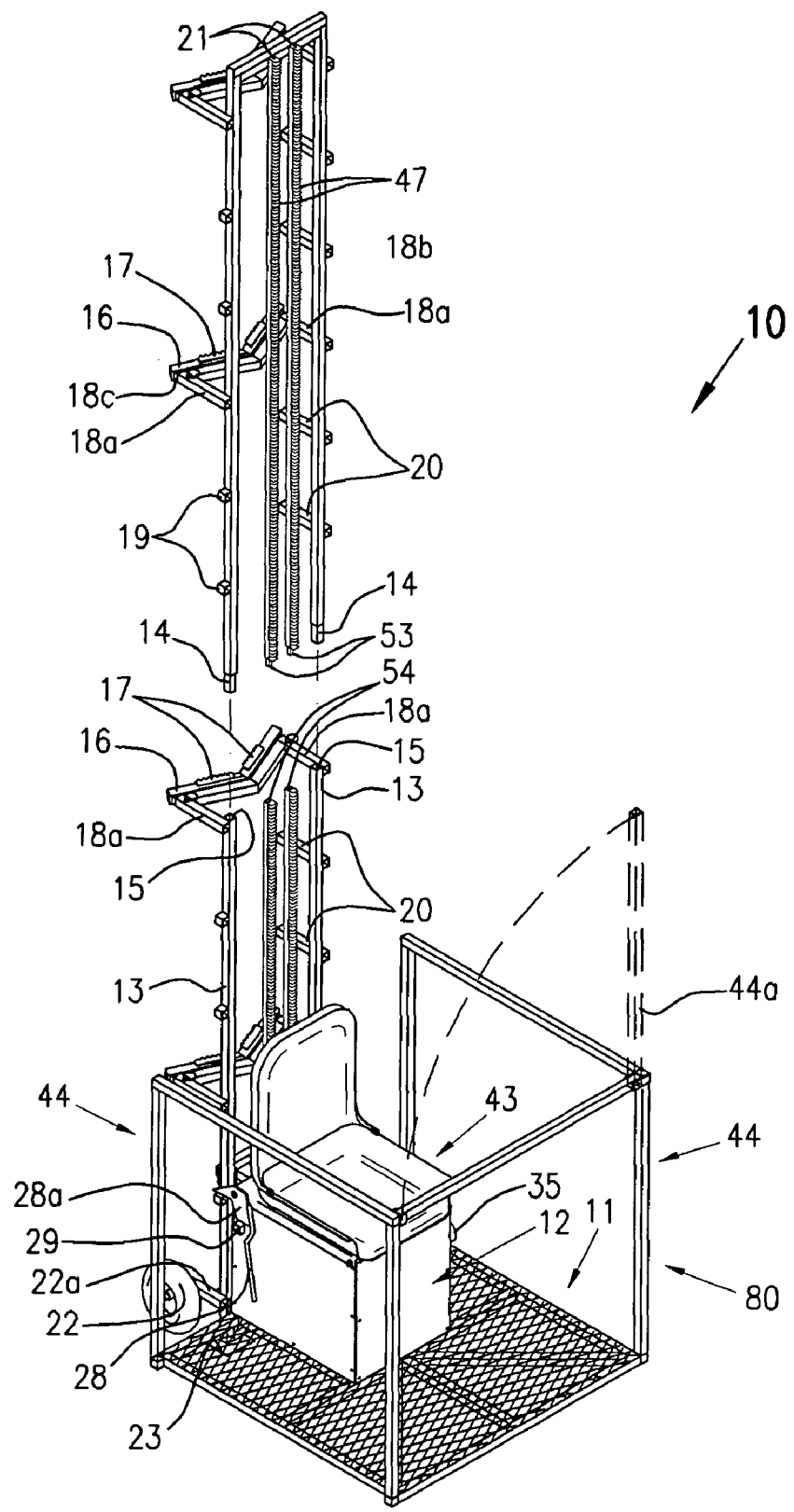
FIG. 6 depicts an alternate embodiment of the lift guide used to lift the platform in the present invention.
Figure 6A:
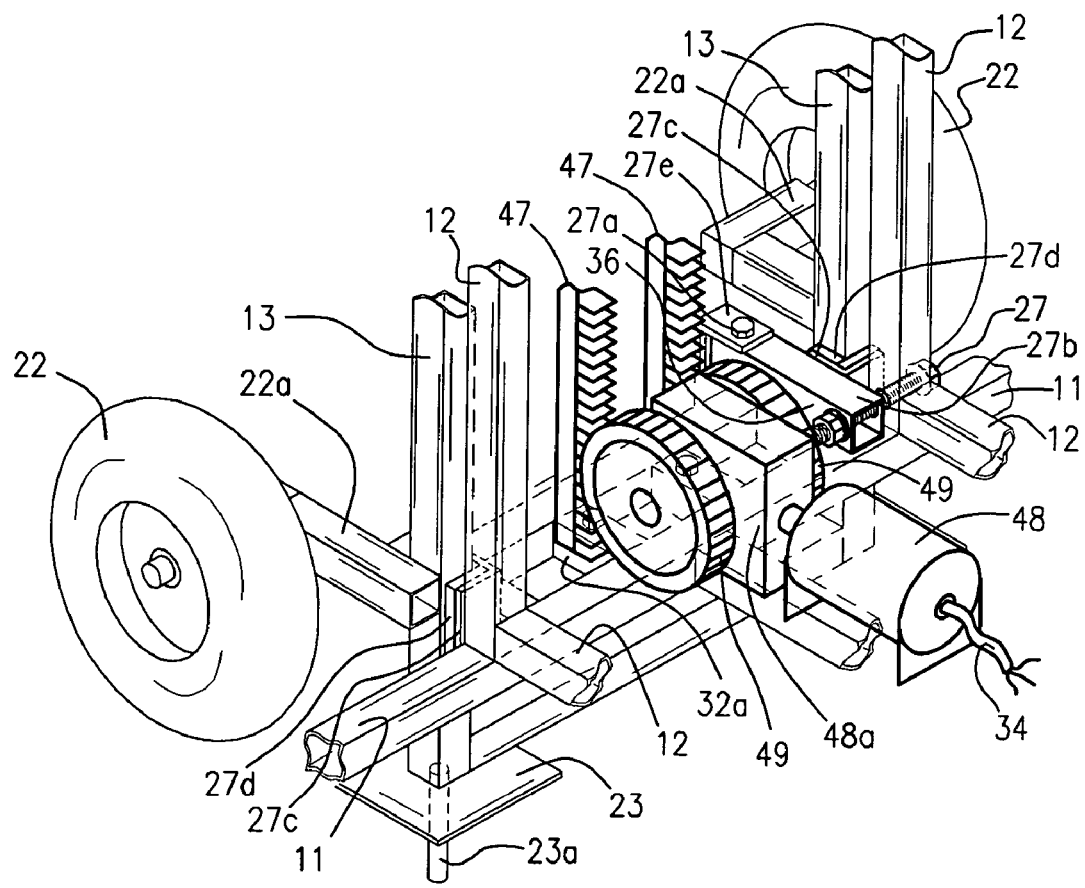
FIG. 6a is a magnified perspective view of the alternate lift guide seen in FIG. 6.

FIG. 6 depicts an alternate means of lifting platform 11 up and down along guide rails 13. FIG. 6 shows gear-tooth rails 47 extending behind platform 11 which supports gear motor 48 (not shown in FIG. 6) and anchored at the top of guide rail section 13. As seen in FIG. 6a, gear motor 48 operates gears 49 to rotate them along gear-toothed rails 47. Because gear motor 48 is attached to platform 11, platform 11 is raised or lowered along gear-toothed rails 47 according to the direction of rotation of gears 49 Although two gear-tooth rails 47 are shown in FIG. 6, it will be recognized that one or more than two gear-tooth rails 47 may be used although the use of only one gear tooth rail 47 is less preferred. Preferably, gear-toothed rails 47 are used with guide rails 13 although it will be recognized by those skilled in the art that gear-toothed rails 47 may replace guide rails 13 to supply both lift guide and lifting functions to powered lift platform 10.

Figure 7:
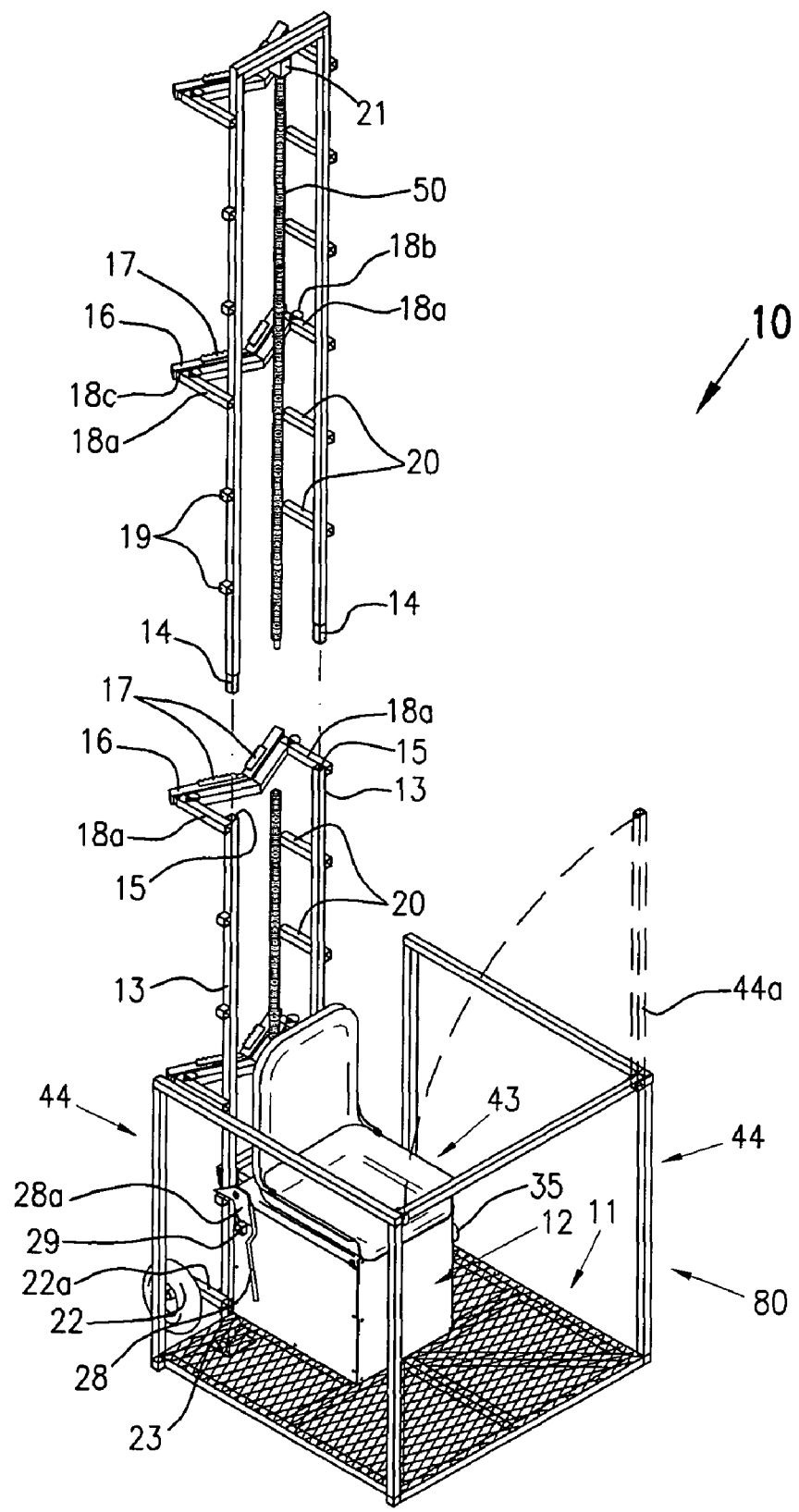
FIG. 7 demonstrates a second alternate embodiment of the lift guide for the powered lift platform of the present invention.
Figure 7A:
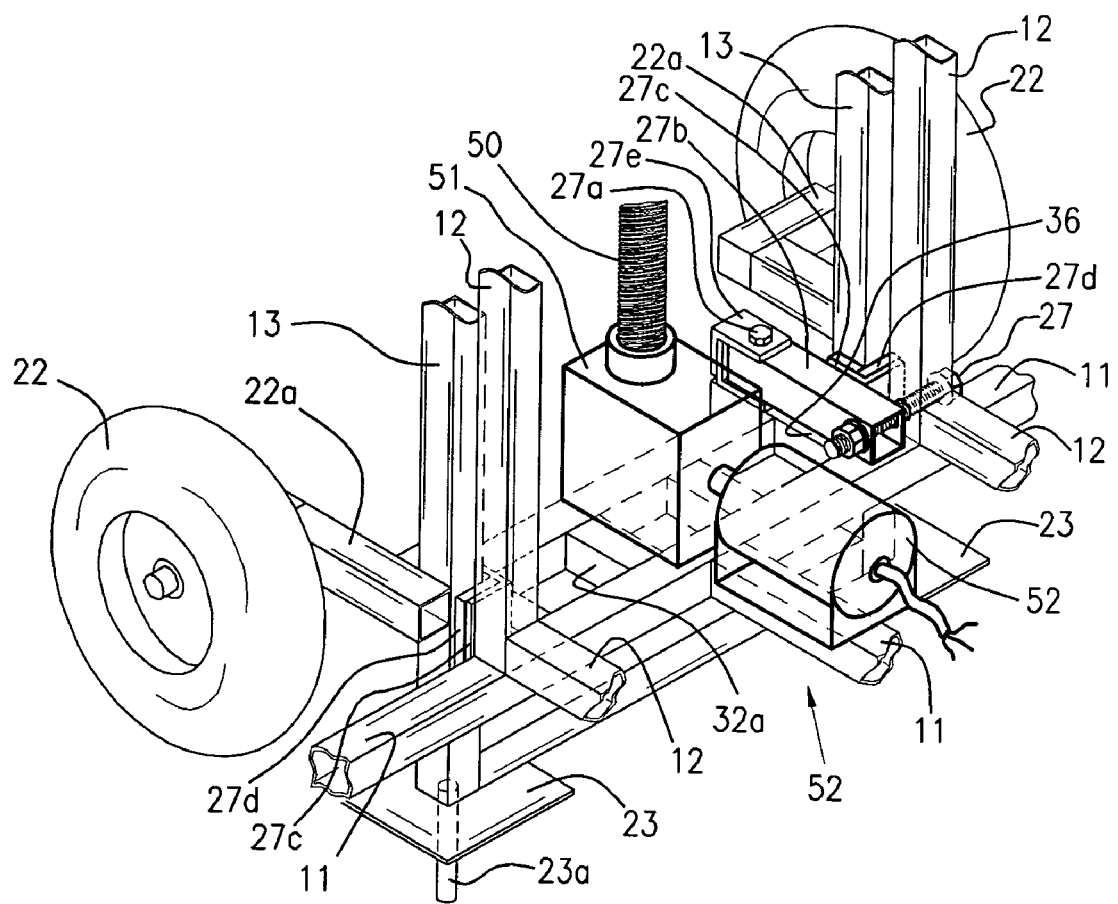
FIG. 7a is a magnified perspective view of the second alternate lift guide for the powered lift platform of the present invention.

FIG. 7 demonstrates a second alternate embodiment of the lift mechanism for powered lift platform 10. Helical carry rod 50 extends from a base or bottom transverse bar 45 to an anchor point 21. FIG. 7a shows ball screw mechanism 51 attached to platform 11 and operated by ball screw motor 52 to traverse up and down helical carry rod 50 thereby lifting platform 11 up and down along helical carry rod 50. Mechanisms able to convert rotational movement to vertical movement are well known in the art.

Figure 8:
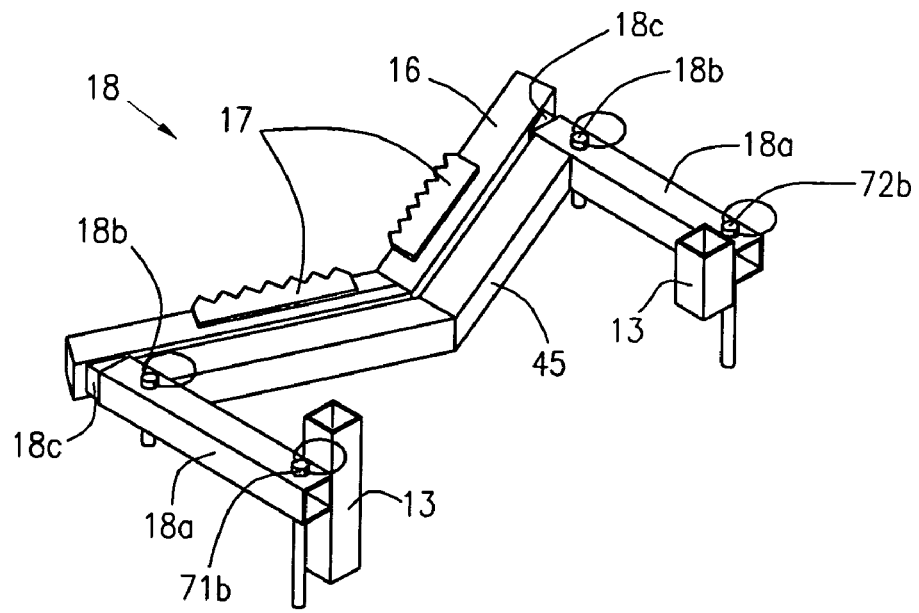
FIG. 8 is a top perspective view of the grippers of the present invention.
Figure 8A:
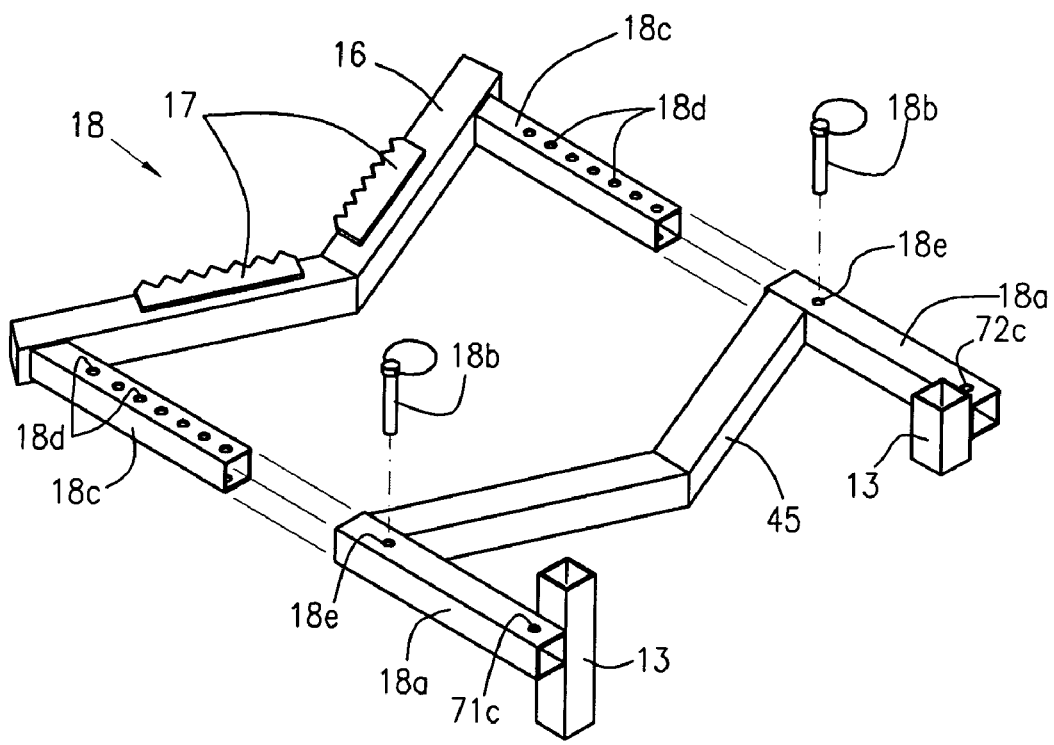
FIG. 8a is an exploded top perspective view of the grippers of the present invention.

FIG. 8 is a top perspective view of grippers 16 adjustably attached to guide rails 13. As will be seen below, grippers 16 having at least one extension from guide rail section 13 are used to support powered lift platform 10 against an upright support such as a tree, pole, lamppost or similar device. In a preferred embodiment, gripper 16 includes teeth 17 and a pair of gripper extensions 18c attached to the v-shaped gripper 16 and containing a plurality of position holes 18d. In an alternate embodiment, gripper 16 may be U-shaped. Gripper 16 is arranged to extend from and retract into gripper adjustment sleeve 18a. In operation, gripper 16 is pulled from gripper extensions 18c and held in a desired position against an upright support by inserting gripper adjustment pin 18b ("pin 18b") through one of position holes 18d and restraining hole 18e. It will be recognized that each of the plurality of grippers 16 can be adjusted individually to establish a stable position for powered lift platform 10 even if the upright support is not straight or is at a sloping angle relative to the ground. In a preferred embodiment, transverse bar 45 extends between guide rails 13 to provide lateral rigidity between the paired guide rails 13

Figure 9:
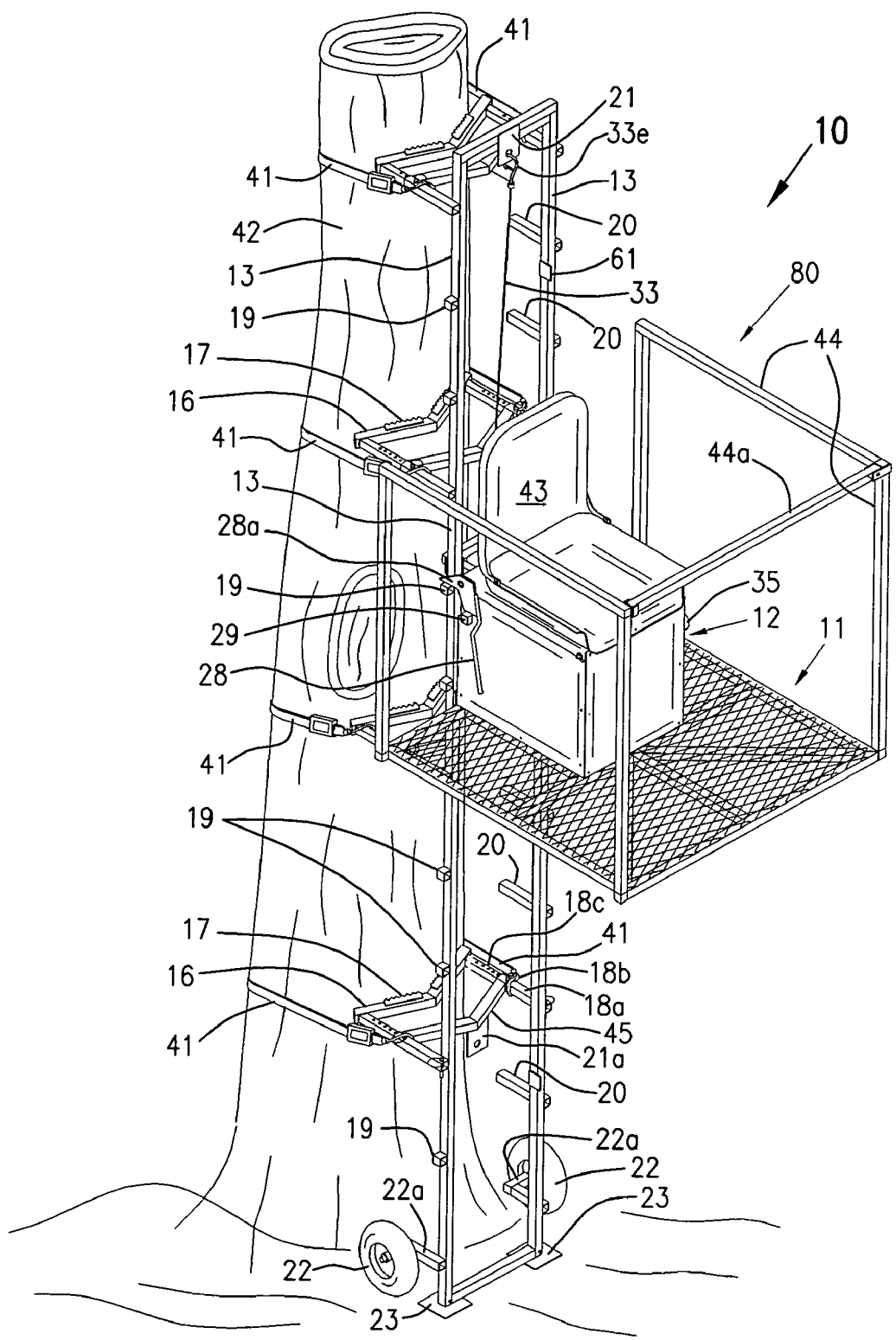
FIG. 9 is a side perspective view of the present invention attached to an upright support.

FIG. 9 shows power lift platform 10 supported against upright support 42, in this case tree 42. Straps 41, preferably ratchet straps 41, are seen wrapped around tree 42 and attached to both ends of transverse bar 45. Powered lift platform 10 is supported substantially upright by placing base plates 23 as close to tree 42 as possible and positioning power lift platform 10 upright near or against tree 42. Grippers 16 are extended to the desired length to produce a preferred vertical or near vertical position. After setting gripper 16 positions on lower guide rails 13, ratchet straps 41 are wrapped around tree 42, connected to gripper 16, or preferably transverse bar 45, and tightened. In a preferred embodiment, cable 33 is attached to lower cable anchor 21a and platform 11 is raised to a desired height. A second set of guide rails 13 is attached to the first or bottom set of guide rails 13 by, for example, inserting guide rail inserts 14 into guide rail sockets 15. The two sets of guide rails 13 may also be attached by bolts, hinges, or other suitable attachment devices known to those skilled in the art. Before attaching this second set, cable 33 is attached to cable anchor 21. After attachment of upper guide rails 13 to lower guide rails 13, winch 32 is operated to move platform 11 up guide rails 13. At a suitable position(s), platform 11 is stopped, gripper 16 is adjusted and additional ratchet straps 41 are wrapped around tree 42 and attached at both ends of gripper 16, or preferably transverse bar 45, as shown in FIG. 9. Once a sufficient number of grippers 16 are attached to tree 42, powered lift platform 10 can be safely operated to move up and down the plurality of guide rails 13.

Figure 10:
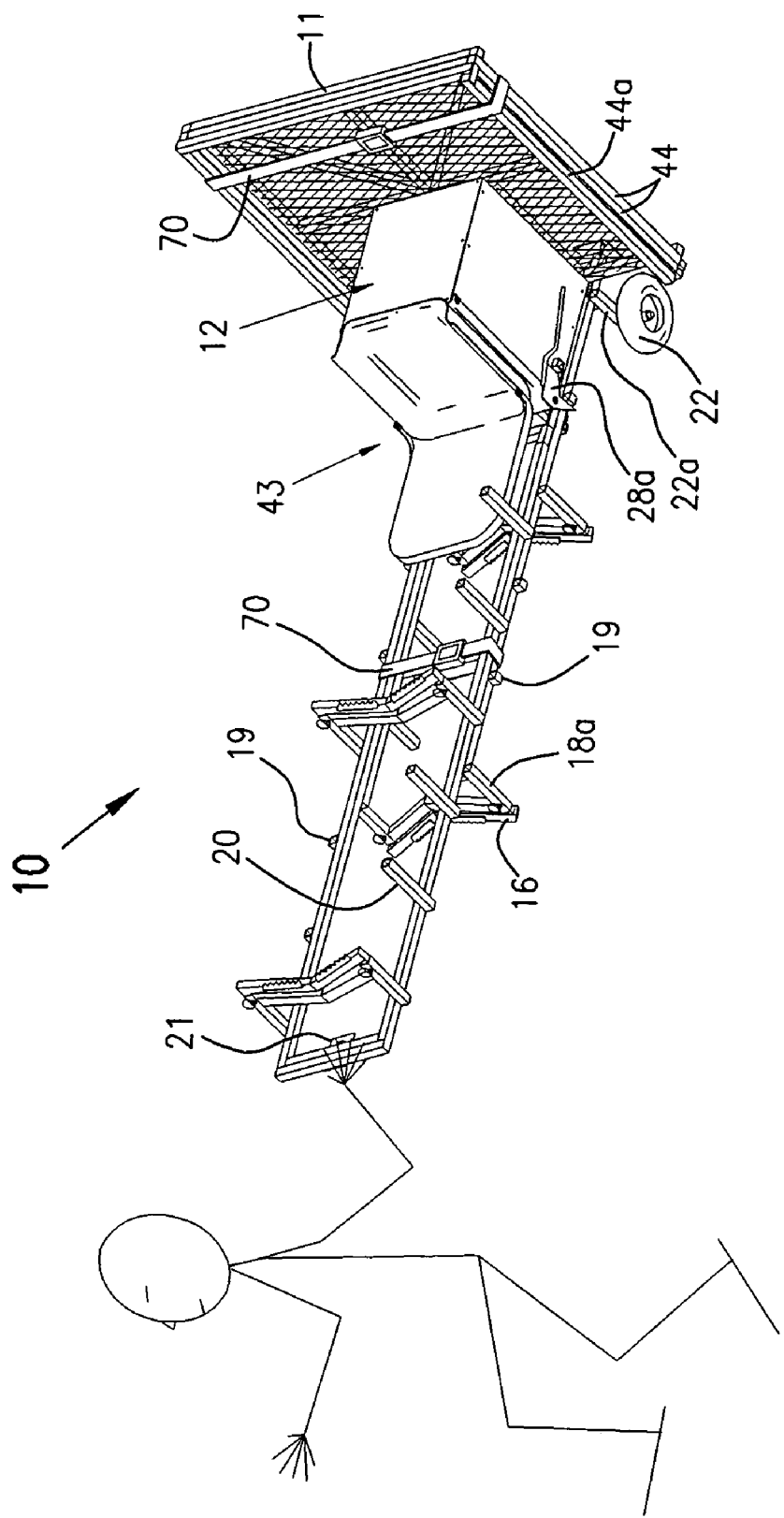
FIG. 10 is a side view of the present invention in a disassembled mode for towing.

FIG. 10 depicts powered lift platform 10 in a disassembled mode with two wheels 22 and two sets of guide rails 13 secured to each other and towed by an individual user. Alternately, a towing attachment may be used to tow powered lift platform 10 using such vehicles as all terrain vehicles, trucks, cars, or other suitable equipment. Hold down straps 70 are used to hold separate guide rails 13 components together and to hold safety rails 44 onto platform 11. Ratchet straps 41 may be used as hold down straps.

Figure 11:
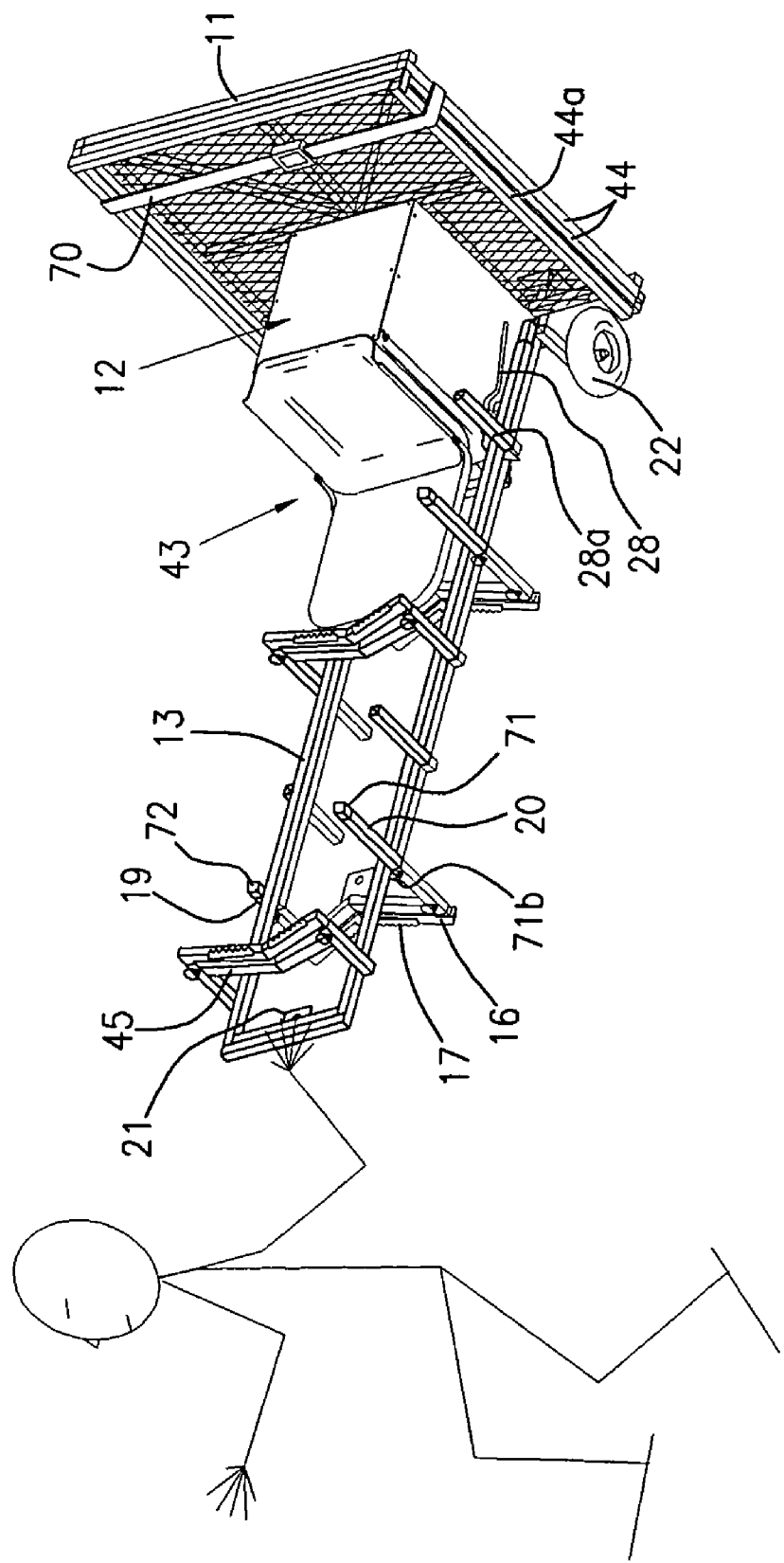
FIG. 11 is a side perspective view of an alternate embodiment of the disassembled mode.
Figure 12:
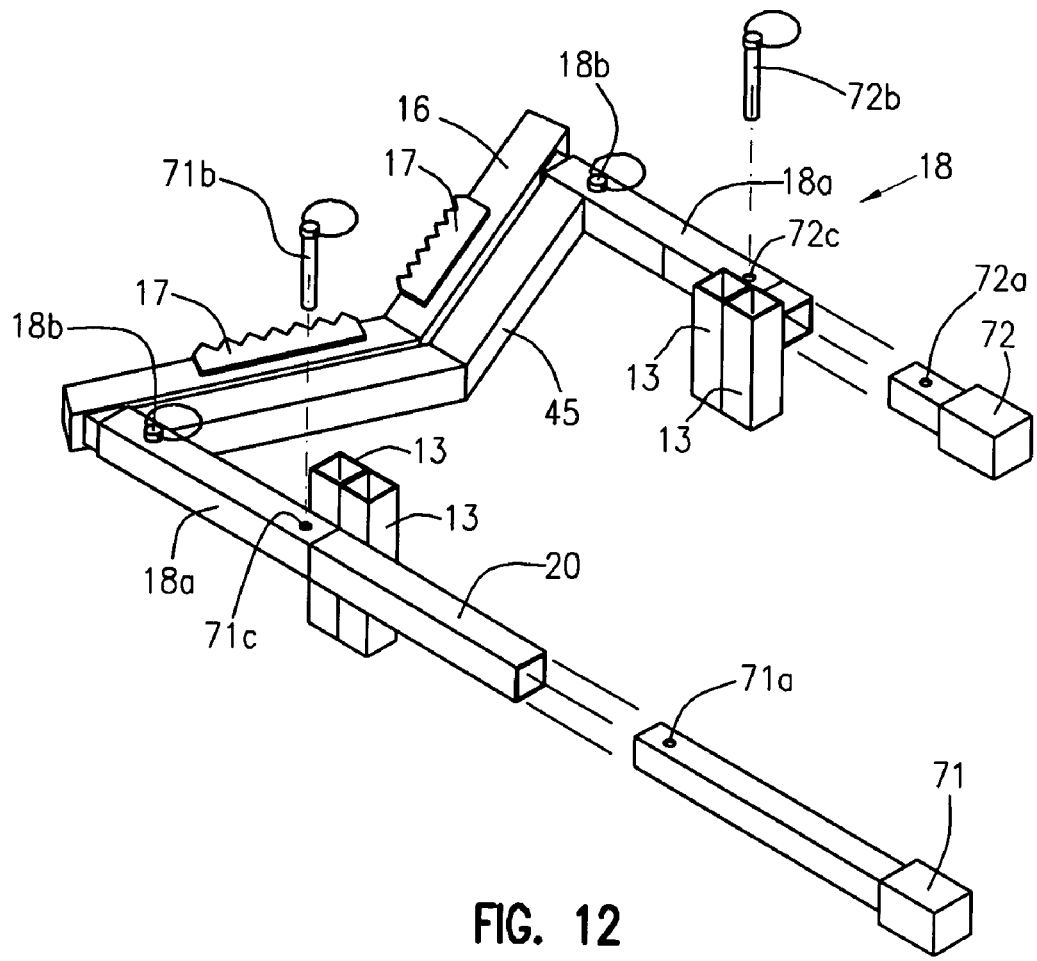
FIG. 12 is an exploded view of the assembly arrangement of the alternate disassembled mode; and, FIG. 12a is a side perspective view of the constructed assembly arrangement seen in FIG. 12.
Figure 12A:
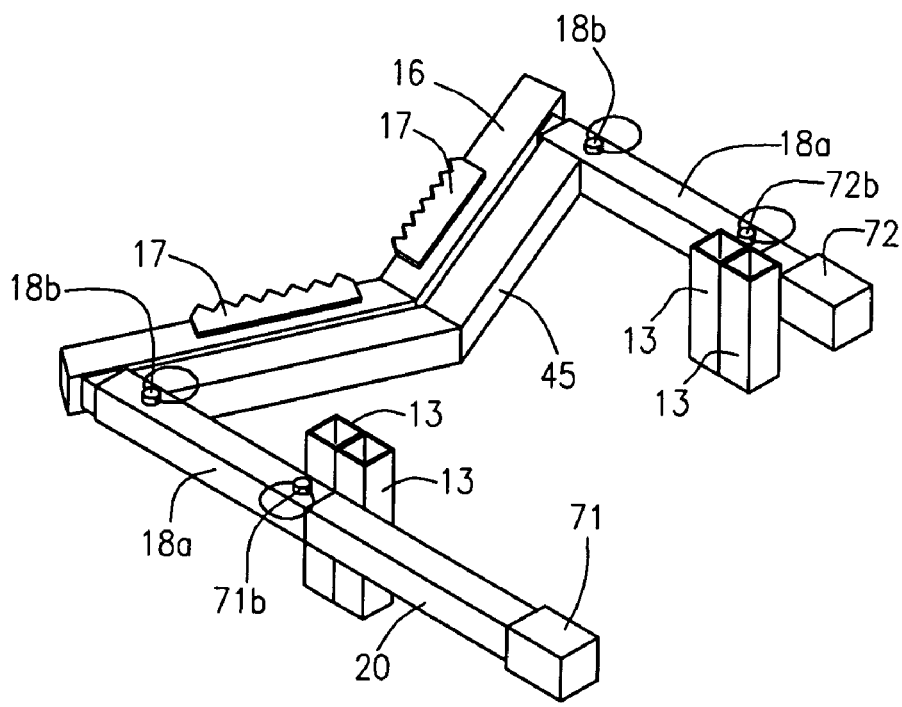

FIGS. 11, 12 and 12a depict a preferred design of the disassembled mode in which safety stops 19 and ladder steps 20 of one guide rail section 13 align with grippers 16 of a second guide rail section 13. FIG. 11 is a perspective view showing this preferred design. FIG. 12 is exploded view of this preferred embodiment in which ladder joiner 71 and safety stop joiner 72 each have a joining hole 71a and 72a, respectively. Ladder joiner 71 is inserted through ladder step 20 into gripper adjustment sleeve 18a and is held in position with pin 71b inserted through joining hole 71a and ladder pin hole 71c. Similarly, safety stop joiner 72 is inserted through safety stop 19 into gripper adjustment sleeve 18a and is held in position with pin 72b which extends through safety stop joining hole 72a and safety stop pin hole 72c. In this embodiment, the two guide rail sections 13 are then held securely in place by joining pins 71b and 72b.

Thus it is seen that the objects of the invention are efficiently obtained, although changes and modifications to the invention should be readily apparent to those having ordinary skill in the art, which changes would not depart from the spirit and scope of the invention as claimed.

10 powered lift platform
11 platform
12 power box
13 guide rails
14 guide rail inserts
15 guide rail sockets
16 gripper
17 gripper teeth
18 gripper adjustment 18*a* gripper adjustment sleeve
18*b* gripper adjustment pin
18*c* gripper adjustment extension
18*d* position hole
18*e* attachment hole
19 safety stop
20 ladder step
21 cable anchor/anchor point
21*a* lower cable anchor
22 wheels
22*a* wheel attachment
23 base plate
23*a* base plate prongs
23*b* telescoping slide
23*c* telescoping slide pin
23*d* telescoping slide adjustment hole
26 upper slide adjustment/bolt
26*a* upper adjustment pivot
26*b* upper adjustment lever arm
26*c* upper adjustment press pad
26*d* upper adjustment guide pad
26*f* bearing
27 lower slide adjustment/bolt
27*a* lower adjustment pivot
27*b* lower adjustment lever arm
27*c* lower adjustment press pad
27*d* lower adjustment guide pad
27*e* lower adjustment spacer
28 safety stop lever
28*a* safety stop blade
29 safety stop block
30 safety stop axle
31 cable break stop
32 winch
32*a* winch frame
33 cable
33*a* cable hook
34 power cord
35 switch
36 gap
37 cable stop frame
38 cable break stop pivot
39 cable rest
40 cable stop
41 ratchet straps
42 tree
43 seat
44 safety rails
44*a* detachable front rail
45 transverse bar
46 cable pivot stop
47 gear-toothed lift rails
48 gear motor
49 gear
50 helical carry rod
51 ball screw mechanism
52 ball screw motor
60 switch
61 actuator
61*a* lower actuator
70 strap
71 ladder joiner
71*a* ladder joiner hole
71*b* ladder joiner pin
71*c* ladder pin hole
72 safety stop joiner
72*a* safety stop joiner hole
72*b* safety stop joiner pin
72*c* safety stop pin hole

We claim:

1. A powered lift platform comprising:
a platform;
at least one guide rail section in operative contact with said platform, each of said at least one guide rail section comprising a pair of guide rails and wherein a first end of each of said guide rail sections is configured to removably attach to a second end of a second guide rail section;
a lift mechanism supported by said platform;
a lift guide in operative contact with said lift mechanism and attached to said at least one guide rail section;
at least one pair of slide adjustments, each one of said pair of slide adjustments attached to opposing sides of said platform and positioned to contact an internal surface of each one of said pair of guide rails to provide lateral stability to said platform as said platform traverses the lengths of one or more of said at least one guide rail section; wherein said internal surfaces of each of said pair of guide rails face inward toward each other; and,
a power supply to operate said lift mechanism.

2. The powered lift platform of as recited in claim 1 further comprising a base plate attached to or integral with the bottom of the lowest of each of said at least one guide rail sections.

3. The powered lift platform as recited in claim 2 wherein said at least one of said at least two base plates further comprises a prong attached to or integral with the ground contacting side of said at least one base plate.

4. The powered lift platform as recited in claim 2 further comprising a base plate adjustment in operative contact with each of said base plates.

5. The powered lift platform as recited in claim 1 wherein said lift mechanism is a winch, and said lift guide is a cable extending from said winch to a cable anchor, said cable anchor comprising said attachment to said at least one guide rail sections.

6. The powered lift platform as recited in claim 1 wherein said lift mechanism is a motor, said motor having a gear and wherein said lift guide is a gear-toothed rail, said gear-toothed rail attached to one of said at least one guide rails.

7. The powered lift platform as recited in claim 1 wherein said lift mechanism is a motor, wherein said motor is configured to operate a ball screw and said lift guide is configured to guide said ball screw up and down said lift guide.

8. The powered lift platform as recited in claim 1 further comprising at least one gripper extending from said at least one guide rail section wherein said at least one gripper is adjustable such that said at least one gripper is extendable and retractable from said at least one guide rail section.

9. The powered lift platform as recited in claim 8 further comprising at least one strap connected to at least one of said at least one grippers wherein said strap is wrapped around a vertical or sloping support to secure said powered lift platform in an upright position.

10. The powered lift platform as recited in claim 9 wherein said at least one strap is a ratchet strap.

11. The powered lift platform as recited in claim 1 further comprising a plurality of safety stops on a first side of said at least one guide rail section and a plurality of ladder steps located on a second side of said at least one guide rail sections.

12. The powered lift platform as recited in claim 11 further comprising a safety lock and wherein said safety lock interacts with one of said plurality of safety stops and one of said plurality of said ladder steps.

13. The powered lift platform as recited in claim 1 further comprising a plurality of ladder steps positioned on said at least one guide rail section.

14. The powered lift platform as recited in claim 1 further comprising a seat supported by said platform.

15. The powered lift platform as recited in claim 1 further comprising a cable break lock functionally associated with said cable.

16. The powered lift platform as recited in claim 1 wherein two or more of said at least one guide rail sections are releasably connected.

17. The powered lift platform as recited in claim 16 wherein said releasable connection comprises the insertion of one of said two or more guide rail sections into another of said two or more guide rail sections.

18. The powered lift platform as recited in claim 16 wherein said two or more guide rail sections are connected by bolts.

19. The powered lift platform as recited in claim 1 further comprising safety rails attached to said platform.

20. The powered lift platform as recited in claim 1 wherein each one of said at least one pair of slide adjustments comprises pads contacting said internal surface of each one of said pair guide rails.

21. The powered lift platform as recited in claim 1 wherein each one of said at least one pair of slide adjustments comprises at least one bearing contacting said internal surface of each one of said pair of guide rails.

22. The powered lift platform as recited in claim 1 wherein said at least one pair of slide adjustments is a pair of upper slide adjustments.

23. The powered lift platform as recited in claim 1 wherein said at least one pair of slide adjustments is a pair of lower slide adjustments.

24. The powered lift platform as recited in claim 1 wherein said at least one pair of slide adjustments is plurality of pairs of slide adjustments.

25. The powered lift platform as recited in claim 1 further comprising at least one wheel operatively attached to said powered lift platform.

* * * * *